United States Patent
Yamada (10) Patent No.: US 11,152,851 B2
(45) Date of Patent: Oct. 19, 2021

(54) SNUBBER CIRCUIT AND POWER CONVERSION APPARATUS

(71) Applicant: FUJI ELECTRIC CO., LTD., Kanagawa (JP)

(72) Inventor: Ryuji Yamada, Hachioji (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 16/910,099

(22) Filed: Jun. 24, 2020

(65) Prior Publication Data
US 2021/0067030 A1 Mar. 4, 2021

(30) Foreign Application Priority Data
Aug. 29, 2019 (JP) .............................. JP2019-156553

(51) Int. Cl.
*H02M 1/34* (2007.01)
*H02M 7/06* (2006.01)

(52) U.S. Cl.
CPC .............. *H02M 1/34* (2013.01); *H02M 7/06* (2013.01); *H02M 1/342* (2021.05)

(58) Field of Classification Search
CPC .......... H02M 1/32; H02M 1/34; H02M 1/344; H02M 1/342; H02M 1/346; H02M 1/348; H02M 7/062; H02M 7/515; H02M 7/06
See application file for complete search history.

(56) References Cited

U.S. PATENT DOCUMENTS

| | | | |
|---|---|---|---|
| 2020/0295652 A1* | 9/2020 | Wang | H02M 7/003 |
| 2021/0067031 A1* | 3/2021 | Yamada | H02M 1/34 |

FOREIGN PATENT DOCUMENTS

| | | |
|---|---|---|
| JP | 2009247132 A | 10/2009 |
| JP | 5516055 B2 | 6/2014 |
| JP | 2016144340 A | 8/2016 |

\* cited by examiner

*Primary Examiner* — Adolf D Berhane (57) ABSTRACT

A snubber circuit is provided, including N charge paths having a positive-side capacitor, a first diode, and a negative-side capacitor connected in series between positive-side wiring and negative-side wiring, and conducts current from a positive side to a negative side; N+1 discharge paths including a second diode connected between a negative-side capacitor in kth charge path and a positive-side capacitor in k+1th charge path and conducts current from a negative side to a positive side via a negative-side capacitor or a positive-side capacitor; other charge paths including an inductor between a positive-side capacitor in ith charge path and a negative-side capacitor in i+1th charge path and conducts current from the positive side to the negative side, and the positive-side capacitor and negative-side capacitor included in the other charge path have a larger capacity than each of the positive-side capacitor and negative-side capacitor not included in the other charge path.

11 Claims, 6 Drawing Sheets

SNUBBER CIRCUIT AND POWER CONVERSION APPARATUS

BACKGROUND

1. Technical Field

The present invention relates to a snubber circuit and a power conversion apparatus.

2. Related Art

Conventionally, a variety of snubber circuit has been proposed for reducing a surge voltage (for example, see Patent document 1-3).

Patent document 1: Japanese Unexamined Patent Application, Publication No. 2016-144340
Patent document 2: Japanese Unexamined Patent Application, Publication No. 2009-247132
Patent document 3: Japanese Patent No. 5516055

In recent years, there is a demand for preventing a device destruction and reducing a circuit loss more reliably.

SUMMARY

To resolve the above-described problem, a snubber circuit is provided in a first aspect of the present invention. The snubber circuit may include N charge paths in parallel (it is noted that N is an integer equal to or larger than two), each of which includes a positive-side capacitor, a first diode, and a negative-side capacitor which are sequentially connected in series between positive-side wiring and negative-side wiring, and conducts current from the side of the positive-side wiring to the side of the negative-side wiring. The snubber circuit may include N+1 discharge paths in parallel, each of which includes a second diode which is connected between a negative-side wiring, or a negative-side capacitor in a kth charge path (it is noted that k is an integer equal to or larger than 0 and smaller than N) among N charge paths, and a positive-side wiring, or a positive-side capacitor in a k+1th charge path among N charge paths, and conducts current from the negative-side wiring to the positive-side wiring via at least one of the negative-side capacitor and the positive-side capacitor. The snubber circuit may include other charge paths which include an inductor connected in series with the second diode between the positive-side capacitor in the ith charge path among N charge paths (it is noted that i is an integer equal to or larger than one and equal to or less than N−1) and the negative-side capacitor in the i+1th charge path, and conducts current from the positive-side wiring to the negative-side wiring via the positive-side capacitor in a ith charge path, a second diode, an inductor, and the negative-side capacitor in the i+1th charge path. Among positive-side capacitors and negative-side capacitors in the ith charge path and the i+1th charge path, the positive-side capacitors and the negative-side capacitors which are included in the other charge paths may have a larger capacity than each of the positive-side capacitors and the negative-side capacitors which are not included in the other charge paths.

The negative-side capacitor and the positive-side capacitor in the other charge path may have a capacity equal to each other. The negative-side capacitor and the positive-side capacitor in the discharge path which passes the second diode and the inductor may have a capacity equal to each other.

N may be two.

The inductance of each charge path may be smaller than the inductance of each discharge path.

In a second aspect of the the present invention, a power conversion apparatus is provided. The power conversion apparatus may include a transformer whose primary side is connected to an AC power source. The power conversion apparatus may include a rectifying circuit which is connected to a secondary side of the transformer and outputs DC voltage between the positive-side wiring and the negative-side wiring according to the output from the secondary side of the transformer. The power conversion apparatus may include the snubber circuit of the first aspect which is connected between the positive-side wiring and the negative-side wiring.

In a third aspect of the the present invention, a power conversion apparatus is provided. The power conversion apparatus may include an inverter or chopper which outputs DC voltage between the positive-side wiring and the negative-side wiring. The power conversion apparatus may include the snubber circuit of the first aspect which is connected between the positive-side wiring and the negative-side wiring.

A wiring of at least one of the positive-side wiring and the negative-side wiring may include an inductance. The resonance period between the inductance of the wiring and the inductance of the inductor in the snubber circuit, and the positive-side capacitor and the negative-side capacitor in the other charge path may be an even multiple of the resonance period between the inductance of the wiring, and the positive-side capacitor and the negative-side capacitor in each of the ith charge path and the i+1th charge path.

The resonance period between the inductance of the wiring and the inductance of the inductor in the snubber circuit, and the positive-side capacitor and the negative-side capacitor in the other charge path may be two times of the resonance period between the inductance of the wiring, and the positive-side capacitor and the negative-side capacitor in each of the ith charge path and the i+1th charge path.

The inductance of the wiring may be equal to the inductance of the inductor in the snubber circuit.

The power conversion apparatus may further include a smoothing inductor provided on at least one of the positive-side wiring and the negative-side wiring.

The power conversion apparatus may include a plurality of snubber circuits between the positive-side wiring and the negative-side wiring.

The summary clause does not necessarily describe all necessary features of the embodiments of the present invention. The present invention may also be a sub-combination of the features described above.

DESCRIPTION OF EXEMPLARY EMBODIMENTS

The following describes the present invention through embodiments of the invention, and the below described embodiments do not limit the scope of the invention according to the claims. In addition, not all combinations of features described in the embodiments are necessarily essential to the solution of the invention.

1. The Circuit Arrangement of the Power Conversion Apparatus

Figure 1:
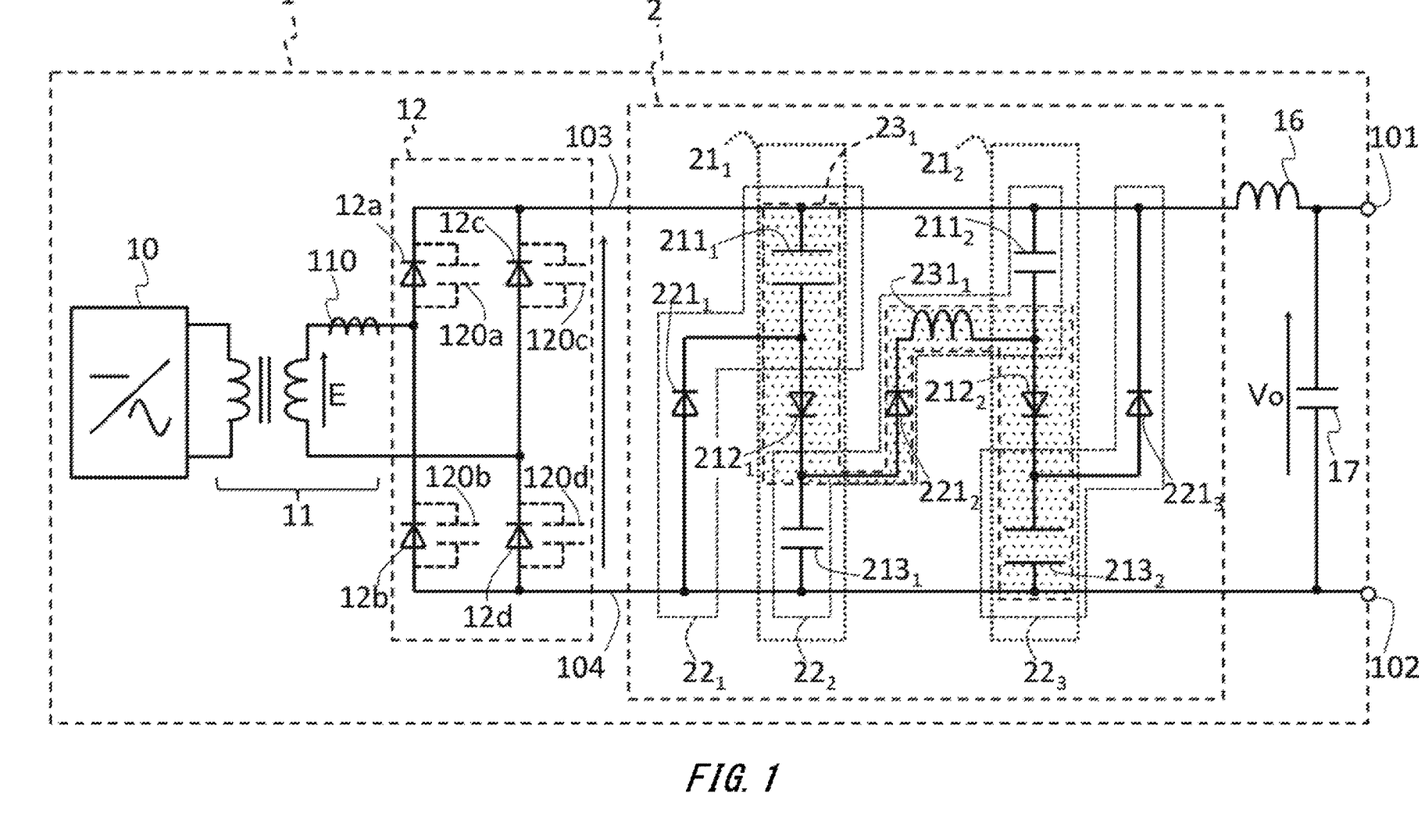
FIG. 1 is a circuit diagram of the power conversion apparatus 1 according to the present embodiment.

FIG. 1 is a circuit diagram of the power conversion apparatus 1 according to the present embodiment. The power conversion apparatus 1 converts AC power to DC power for output. The power conversion apparatus 1 includes the AC power source 10, the transformer 11, the rectifying circuit 12, the snubber circuit 2, the smoothing inductor 16, and the smoothing capacitor 17. The power conversion apparatus 1 may include the rectifying circuit 12, the snubber circuit 2, the smoothing capacitor 17, and the like between the positive-side wiring 103 and the negative-side wiring 104, and may output DC voltage from the positive-side output terminal 101 and the negative-side output terminal 102 connected to the positive-side wiring 103 and the negative-side wiring 104. The positive-side output terminal 101 and the negative-side output terminal 102 may be connected with one or more loads (not illustrated).

1-1. AC Power Source 10

The AC power source 10 outputs AC power. In the present embodiment, the AC power source 10 is a DC/AC inverter, but it may commercial power supply. The AC power source 10 may supply AC power to the transformer 11.

1-2. Transformer 11

The primary side of the transformer 11 is connected to the AC power source 10, and the secondary side is connected to the rectifying circuit 12. The transformer 11 may transform the AC power from the AC power source 10 and supply it to the rectifying circuit 12 while insulating between the AC power source 10 and the rectifying circuit 12. As one example, in the present embodiment, an electromotive force E may occur in the secondary winding of the transformer 11.

It is noted that the secondary side of the transformer 11 may have a leakage inductance 110. Thereby, at least one of the positive-side wiring 103 and the negative-side wiring 104 may have an inductance.

1-3. Rectifying Circuit 12

The rectifying circuit 12 is connected to the secondary side of the transformer 11, and outputs the DC voltage between the positive-side wiring 103 and the negative-side wiring 104 according to the output from the secondary side of the transformer 11. As one example, in the present embodiment, the rectifying circuit 12 is a diode bridge and performs full-wave rectification on the AC power which is output from the secondary side of the transformer 11. The rectifying circuit 12 may include four diodes 12a-12d. Each of the diode 12a and the diode 12b, and the diode 12c and the diode 12d may be connected in series between the positive-side wiring 103 and the negative-side wiring 104.

Each of the diodes 12a-12d may have parasitic capacitance 120a-120d. The parasitic capacitance 120a-120d may resonate with the leakage inductance 110 of the transformer 11. The rectifying circuit 12 may supply the voltage after the rectification to the load (not illustrated) via the snubber circuit 2, the smoothing inductor 16, and the smoothing capacitor 17.

1-4. Snubber Circuit 2

The snubber circuit 2 is connected between the positive-side wiring 103 and the negative-side wiring 104. The snubber circuit 2 absorbs a surge voltage caused when the direction of the current switches in the rectifying circuit 12 (in the present embodiment, in one example, when the alternating current supplied from the secondary side of the transformer 11 to the rectifying circuit 12 reaches zero) to protect each element of the power conversion apparatus 1 (as one example, the diodes 12a-12d of the rectifying circuit 12, and the like).

The snubber circuit 2 has N charge paths 21 in parallel, N+1 discharge paths 22 in parallel, and one or more other charge paths 23 in parallel. It is noted that the quantity N is an integer equal to or larger than two. In the present embodiment, N is two as one example. In addition, in the present embodiment, as one example, the two charge paths 21 are sequentially described as the first charge path $21_1$ and the second charge path $21_2$ from the left side of the figure. In addition, three discharge paths 22 are sequentially described as the first discharge path $22_1$, the second discharge path $22_2$, and the third discharge path $22_3$ from the left side of the figure. The index 1, N indicate numbers of paths. In the figure, the charge path 23 is indicated with shading.

1-4-1. Charge Path 21

Each charge path $21_k$ (k is each of integers equal to or larger than one and equal to or less than N) has the positive-side capacitor 211 (also referred to as the positive-side capacitor $211_k$), the first diode 212 (also referred to as the first diode $212_k$), and the negative-side capacitor 213 (also referred to as the negative-side capacitor $213_k$) which are sequentially connected in series between the positive-side wiring 103 and the negative-side wiring 104. Each of the positive-side capacitor 211 and the negative-side capacitor 213 acts as an snubber capacitor, and may absorb an instantaneous surge voltage caused when the current switches in the rectifying circuit 12 (as one example, a surge voltage applied to the element for a period longer than 10 ns and shorter than 10 μs). For example, the positive-side capacitor 211 and the negative-side capacitor 213 may suppress vibration larger than 100 kHz and smaller than 100 MHz. The positive-side capacitor 211 and the negative-side capacitor 213 may be a film capacitor or a stacked ceramic capacitor, as one example.

The first diode 212 is arranged such that the anode is oriented toward the side of the positive-side wiring 103 and the cathode is oriented toward the side of the negative-side wiring 104. Thereby, each charge path 21 conducts current from the side of the positive-side wiring 103 to the side of the negative-side wiring 104.

1-4-2. Discharge Path 22

Each discharge path $22_k$ has the second diode 221 (also referred to as the second diode $221_k$). The second diode $221_k$ is connected between the negative-side wiring 104 or the negative-side capacitor $213_k$ in the kth charge path $21_k$ among N charge paths 21, and the positive-side wiring 103 or the positive-side capacitor $211_{k+1}$ in the k+1th charge path $21_{k+1}$ among the N charge paths 21. For example, the second diode $221_1$ of the first discharge path $22_1$ is connected between the negative-side wiring 104 and the positive-side capacitor $211_1$ of the first charge path $21_1$. The second diode $221_2$ of the second discharge path $22_2$ is connected between the negative-side capacitor $213_1$ of the first charge path $21_1$ and the positive-side capacitor $211_2$ of the second charge path $21_2$. The second diode $221_3$ of the third discharge path $22_3$ is connected between the negative-side capacitor $213_2$ of the second charge path $21_2$, and the positive-side wiring 103. The second diode 221 is arranged such that the anode is oriented toward the side of the negative-side wiring 104 or the kth charge path $21_k$, and the cathode is oriented toward the positive-side wiring 103 or the k+1th charge path $21_{k+1}$. Thereby, each discharge path 22 conducts current from the side of the negative-side wiring 104 to the side of the positive-side wiring 103 via at least one of the negative-side capacitor 213 and the positive-side capacitor 211.

The inductance of each discharge path 22 may be larger than the inductance of each charge path 21. That is, the inductance of each charge path 21 is smaller than the inductance of each discharge path 22. For example, the wiring length of each charge path 21 may be shorter than the wiring length of each discharge path 22. As one example, the wiring length of each charge path 21 linking the positive-side wiring 103 and the negative-side wiring 104 may be shorter than the wiring length of each discharge path 22 linking the positive-side wiring 103 and the negative-side wiring 104.

1-4-3. Charge Path 23

One or more charge paths 23 (also referred to as the charge path $23_i$, and i is at least one integer equal to or larger than one and equal to or smaller than N−1) have the inductor 231 (also referred to as the inductor $231_i$). The inductor $231_i$ is connected in series with the second diode $221_i$ between the positive-side capacitor $211_i$ in the ith charge path $21_i$ (i is an integer equal to or larger than one and equal to or less than N−1) and the negative-side capacitor $213_{i+1}$ in the i+1th charge path $21_{i+1}$ among the N charge paths 21. Therefore, the inductor $231_i$ may be included in the discharge path $22_i$, and the second diode 221 may be included in the charge path $23_i$. Thereby, each charge path $23_i$ conducts current from the side of the positive-side wiring 103 to the side of the negative-side wiring 104 via the positive-side capacitor $211_i$ in the ith charge path $21_i$, the second diode $221_i$, the inductor $231_i$, and the negative-side capacitor $213_{i+1}$ in the i+1th charge path $21_{i+1}$. If the discharge path 22 has the inductor 231, the inductance of the discharge path 22 may include the inductance of the inductor 231. It is noted that, in the present embodiment, since the quantity N of the charge paths 22 is two as one example, the quantity i of the charge paths 23 may be 1.

1-4-4. Positive-Side Capacitor 211 and Negative-Side Capacitor 213

Among each positive-side capacitor $211_i$ and $211_{i+1}$, and the negative-side capacitor $213_i$ and $213_{i+1}$ in the charge path $21_i$ and $21_{i+1}$, the positive-side capacitor 211, and the negative-side capacitor $213_{i+1}$, which are included in the charge path $23_i$, have a larger capacity than each of the positive-side capacitor $211_{i+1}$ and the negative-side capacitor $213_i$, which are not included in the charge path $23_i$. For example, each capacitor present on the charge path $21_i$ and $21_{i+1}$, and the charge path $23_i$ may have a larger capacity than the capacitor present only on the charge path $21_i$ and $21_{i+1}$. In addition, each of the positive-side capacitor 211 and the negative-side capacitor $213_{i+1}$ in the charge path $23_i$ may have a larger capacity than each of the negative-side capacitor $213_i$ and the positive-side capacitor $211_{i+1}$ in the discharge path $22_i$ passing through the second diode $221_i$ and the inductor 231, in the charge path $23_i$. In the present embodiment, as one example, each of the positive-side capacitor $211_1$ and the negative-side capacitor $213_2$ in the charge path $23_1$ has a larger capacity than each of the negative-side capacitor $213_1$ and positive-side capacitor $211_2$ in the discharge path $22_2$.

1-5. Smoothing Inductor 16

The smoothing inductor 16 is provided on the positive-side wiring 103. The smoothing inductor 16 may smooth the current output from the power conversion apparatus 1. It is noted that the smoothing inductor 16 may be provided on the negative-side wiring 104 in addition to or instead of being provided on the positive-side wiring 103.

1-6. Smoothing Capacitor 17

The smoothing capacitor 17 is provided between the positive-side wiring 103 and the negative-side wiring 104. The smoothing capacitor 17 may smooth the current output from the power conversion apparatus 1. The voltage of the smoothing capacitor 17, that is, the output voltage Vo from the power conversion apparatus 1 may be smaller than the electromotive force E of the secondary winding in the transformer 11.

1-7. Operation of the Power Conversion Apparatus 1

In the power conversion apparatus 1 according to the present embodiment, the positive-side capacitor 211 and the negative-side capacitor 213 are charged via the charge paths 21 and 23 in a period when the output current from the rectifying circuit 12 increases, and the positive-side capacitor 211 and the negative-side capacitor 213 are discharged via the discharge path 22 during a period when the output current decreases. In addition, when the alternating current supplied to the rectifying circuit 12 reaches zero, the direction of the current switches in the rectifying circuit 12 and the surge voltage occurs. This surge voltage may increase due to the resonance between the leakage inductance 110 and the parasitic capacitance 120, and the reverse recovery current of the diode 12.

On the other hand, because the positive-side capacitor 211 and the negative-side capacitor 213 in the snubber circuit 2 are in the state of discharged when the surge voltage occurs, the surge voltage is absorbed by the positive-side capacitor 211 and the negative-side capacitor 213 which are charged via the charge path 21 and 23, and then the positive-side capacitor 211 and the negative-side capacitor 213 are discharged. Hereinafter, the operation in these cases will be described.

1-7-1. Absorbing the Surge Voltage Via the Charge Path 21

Figure 2:
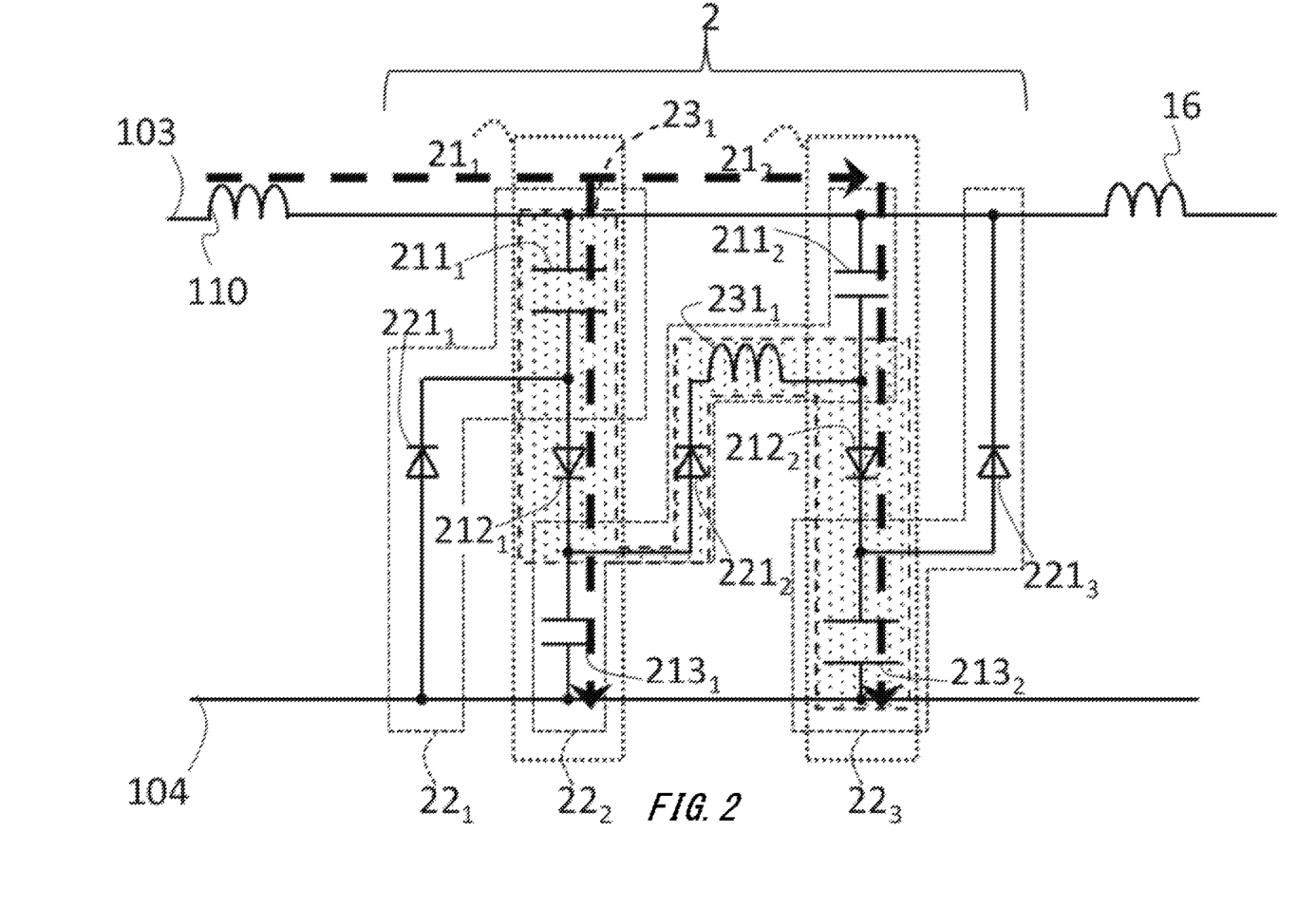
FIG. 2 shows a current flow in a case where the surge voltage is absorbed via the charge path 21.

FIG. 2 shows the current flow in a case where the surge voltage is absorbed via the charge path 21. It is noted that the dash arrow in the figure indicates the current flow.

When the direction of the current switches in the rectifying circuit 12, the output current from the rectifying circuit 12 stops decreasing and starts increasing. This output current flows to the positive-side capacitor 211 of each charge path 21, the first diode 212, and the negative-side capacitor 213. Thereby, the energy accumulated in the inductance 110 in a case where the direction of the current switches in the rectifying circuit 12 is absorbed through the charging of the positive-side capacitor 211 and the negative-side capacitor 213 in the charge path 21.

Herein, in the the present embodiment, as one example, the positive-side capacitor $211_1$ in the charge path $21_1$ has a larger capacity than the negative-side capacitor $213_1$, and the negative-side capacitor $213_2$ in the charge path $21_2$ has a larger capacity than the positive-side capacitor $211_2$. Therefore, among the positive-side capacitors 211 and the negative-side capacitors 213 included in the charge paths $21_1$ and $21_2$, the voltage of the negative-side capacitor $213_1$ and the positive-side capacitor $211_2$, which are not included in the charge path $23_1$, increases more earlier than the voltage of the positive-side capacitor $211_1$ and the negative-side capacitor $213_2$, which are included in the charge path $23_1$.

1-7-2. Absorbing the Surge Voltage Via the Charge Path 23

Figure 3:
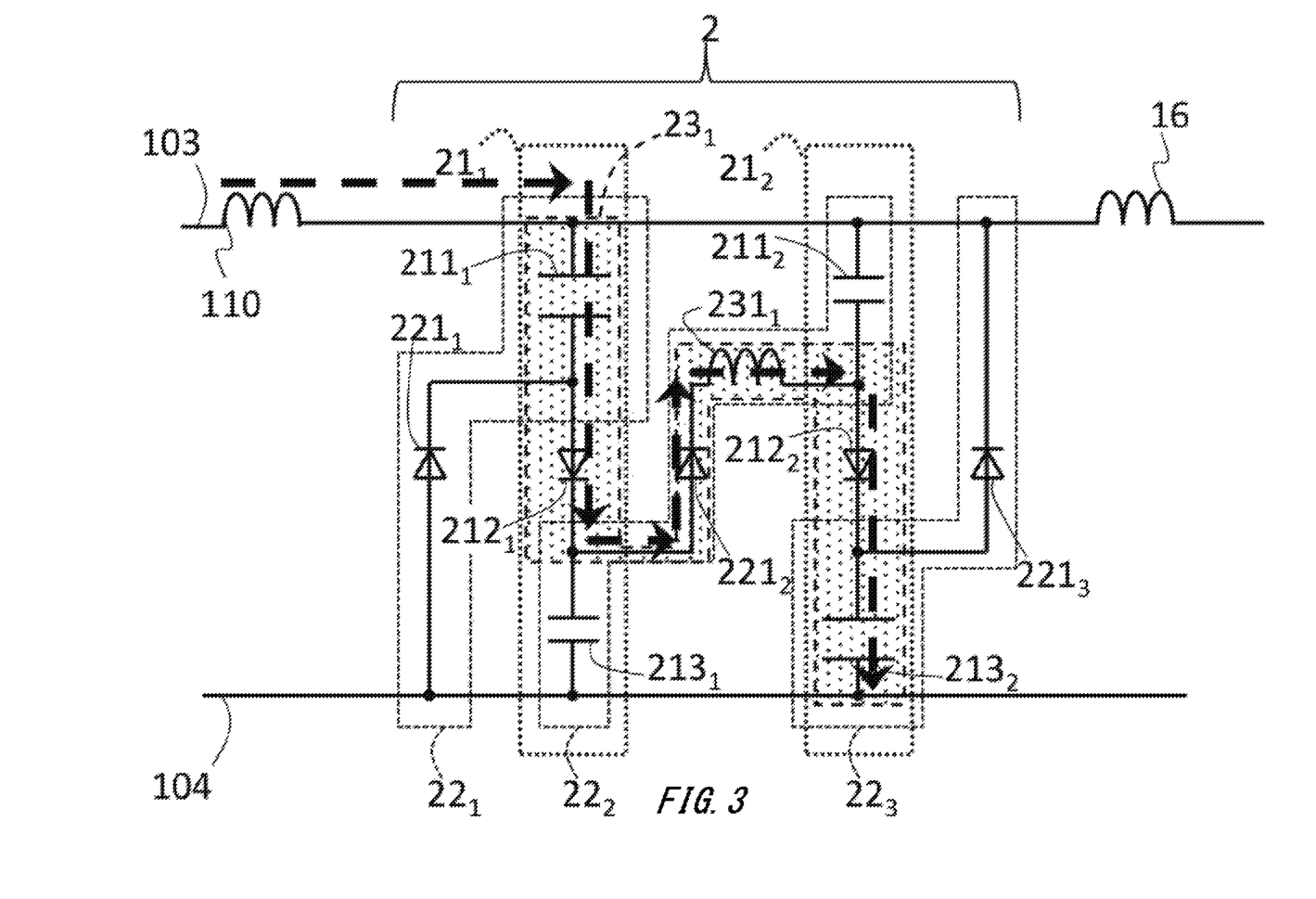
FIG. 3 shows a current flow in a case where the surge voltage is absorbed via the charge path 23.

FIG. 3 shows the current flow in a case where the surge voltage is absorbed via the charge path 23. Because the charge path 23 is provided with the inductor 231, the current of the charge path 23 may be suppressed immediately after the surge voltage occurs. When the voltage of the negative-side capacitor $213_1$ and the positive-side capacitor $211_2$ becomes higher than the voltage of the positive-side capacitor $211_1$ and the negative-side capacitor $213_2$ due to the charging via the charge path 21, the output current from the rectifying circuit 12 flows to the positive-side capacitor $211_k$, the first diode $212_1$, the second diode $221_2$, the inductor 231, the first diode $212_2$, and the negative-side capacitor $213_2$. Thereby, when the direction of the current switches in the rectifying circuit 12, the energy accumulated on the inductance 110 is also absorbed by the positive-side capacitor $211_1$ and the negative-side capacitor $213_2$ of the charge path $23_1$ which are being charged.

Herein, in the present embodiment, each of the positive-side capacitor $211_1$ and the negative-side capacitor $213_2$ has a larger capacity than each of the negative-side capacitor $213_1$ and the positive-side capacitor $211_2$. Therefore, when the positive-side capacitor 211 and the negative-side capacitor 213 absorbs the surge voltage via the charge path 21 and charge path 23 in the above-described manner,
the effect of preventing the influx of further energy by the voltage which increases early due to the small capacity of the negative-side capacitor $213_1$ and the positive-side capacitor $211_2$ can be achieved together with the effect of suppressing the further increase of the voltage by the large capacity of the positive-side capacitor $211_1$ and the negative-side capacitor $213_2$. As a result, the voltage of each discharge path 22 may be smaller than the electromotive force E at the secondary side of the transformer 11. Therefore, because the energy which charged the charge path 21 and 23 are not discharged from the discharge path 22, the energy which charged the positive-side capacitor 211 and the negative-side capacitor 213 when the direction of the current switches in the rectifying circuit 12 is accumulated on the positive-side capacitor 211 and the negative-side capacitor 213 and regenerated without being charged and discharged by the resonance behavior between the leakage inductance 110 and the positive-side capacitor 211 and the negative-side capacitor 213 and to be consumed as a circuit loss. Thereby, the circuit loss due to the resonance behavior is reduced.

1-7-3. Discharge of the Surge Voltage Via the Discharge Path 22

Figure 4:
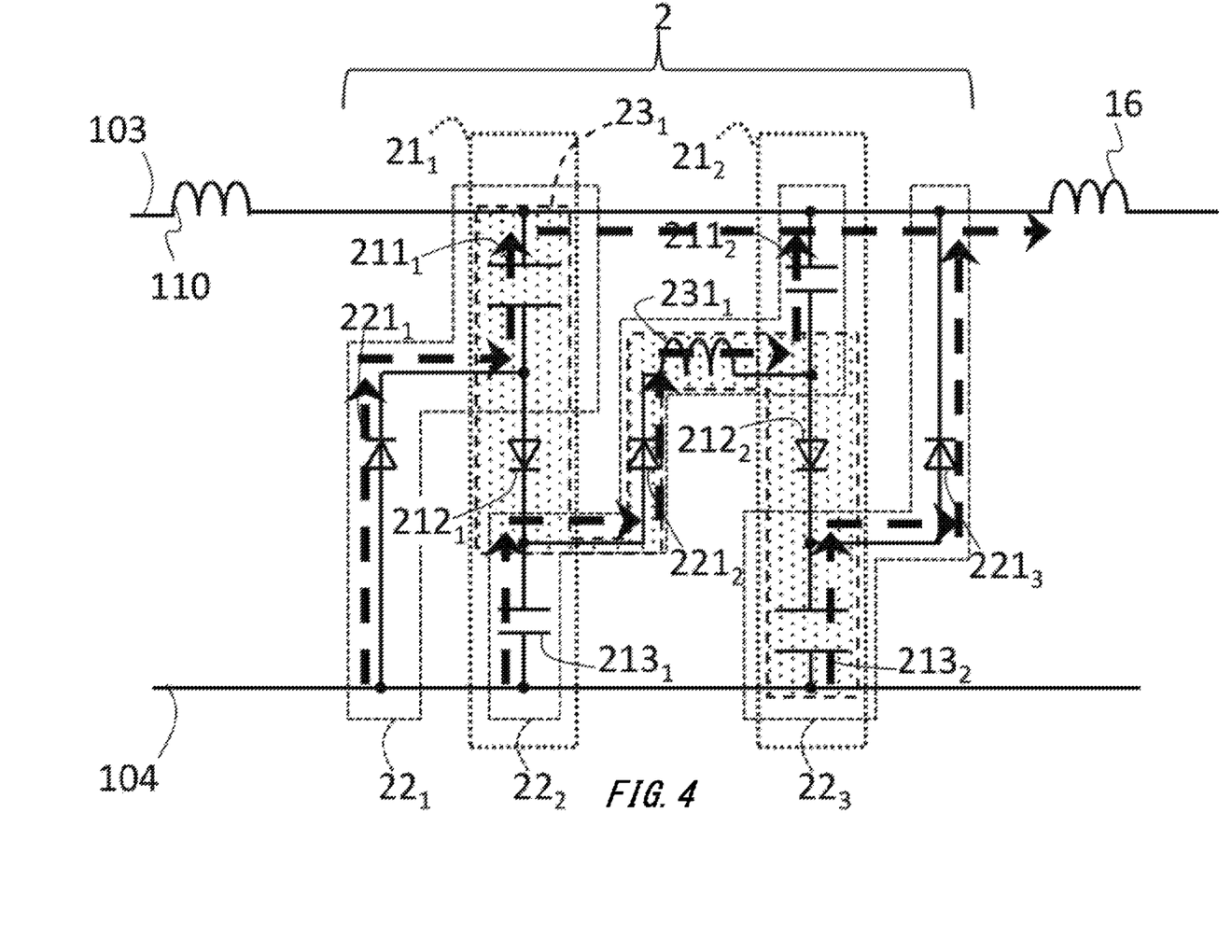
FIG. 4 shows a current flow in a case where the surge voltage is discharged via the discharge path 22.

FIG. 4 shows a flow of the current in a case where the surge voltage is discharged via the discharge path 22. The electromotive force at the input side of the circuit, that is, the voltage between the positive-side wiring 103 and the negative-side wiring 104 becomes lower than the output voltage Vo, the smoothing inductor 16 performs an operation to extract the constant current through the smoothing effect. On the other hand, because the electromotive force is higher than 0V due to the charge accumulated on each capacitor in each discharge path $22_1$-$22_3$, the current of the smoothing inductor 16 is supplied from these capacitors. Thereby, each capacitor is discharged until the charged voltage becomes 0V. Because the discharge current is mainly determined by the smoothing inductor 16 and is not significantly affected by the resistance component of the circuit, the circuit loss in the discharge is much smaller as compared with the case when the current is discharged via a resistor.

With the above-described snubber circuit 2, the N charge paths 21 (in the present embodiment, as one example, N=2) in parallel having the positive-side capacitor 211 and the negative-side capacitor 213 are provided. Therefore, the energy accumulated on the inductance 110 when the direction of the current switches in the rectifying circuit 12 flows through each charge path 21 to charge the positive-side capacitor 211 and the negative-side capacitor 213 to a voltage higher than the voltage between the positive-side wiring 103 and the negative-side wiring 104 (in the present embodiment, as one example, the electromotive force E in the transformer 11). Thereby, the device destruction due to the surge voltage is prevented.

In addition, the snubber circuit 2 is provided with other charge path 23 which conducts current from the side of the positive-side wiring 103 to the side of the negative-side wiring 104 via the positive-side capacitor $211_i$, the second diode $221_{i+1}$, and the negative-side capacitor $213_{i+1}$. Therefore, when the direction of the current switches in the rectifying circuit 12, the charging is also achieved by the charge path 23. In addition, the inductor 231 is connected in series with the second diode $221_{i+1}$ between the positive-side capacitor $211_i$ and the negative-side capacitor $213_{i+1}$, and each of the positive-side capacitor $211_i$ and the negative-side capacitor $213_{i+1}$ in the charge path $23_i$ has a larger capacity than each of the negative-side capacitor 213 and the positive-side capacitor $211_{i+1}$. Therefore, when the direction of the current switches in the rectifying circuit 12, the positive-side capacitor $211_i$ and $211_{i+1}$ and the negative-side capacitor $213_i$ and $213_{i+1}$ start to be charged by the charge path $21_i$ and $21_{i+1}$, and then the positive-side capacitor $211_i$ and the negative-side capacitor $213_{i+1}$ are started to be charged by the charge path $23_i$. Therefore, because the voltage of the negative-side capacitor $213_i$ and the positive-side capacitor $211_{i+1}$ with a small capacity increase early due to the charging via the charge path $21_i$ and $21_{i+1}$ and then the voltage of the positive-side capacitor $211_i$ and the negative-side capacitor $213_{i+1}$ with a large capacity increase due to the charging via the charge path $23_i$, the timings when the voltage caused between the positive-side wiring 103 and the negative-side wiring 104 increases are distributed and the peak voltage can be reduced. Therefore, the device destruction due to the surge voltage can be prevented more reliably.

In addition, the snubber circuit 2 is provided with N+1 discharge paths 22 which conduct current from the side of the negative-side wiring 104 to the side of the positive-side wiring 103 via at least one of the negative-side capacitor 213 and the positive-side capacitor 211. Herein, when the surge voltage caused by switching the direction of the current in the rectifying circuit 12 is absorbed by each charge path 21 and each charge path 23, because the voltage in each discharge path 22 is smaller than the electromotive force E at the secondary side of the transformer, the energy which charged the charge path 21 and 23 is not discharged by the discharge path 22 during a period when the electromotive force E is being applied. Therefore, the recharge after the discharge, that is, the resonance behavior does not occur. The energy which charged the positive-side capacitor 211 and the negative-side capacitor 213 when the direction of the current switches in the rectifying circuit 12 is maintained until the timing when the electromotive force at the secondary side becomes 0V, and then regenerated at the side of the load due to the current extraction operation of the above-described smoothing inductor 16. Thereby, the circuit loss due to the resonance behavior is reduced.

In addition, because thereby the device destruction due to the surge voltage upon the switching of the direction of the current in the rectifying circuit 12 is prevented and the circuit loss can be reduced, the acceptable amount of the inductance of the wiring connected to the positive-side wiring 103 and the negative-side wiring 104 can be increased. In other word, the degree of freedom of the wiring length of the positive-side wiring 103 and the negative-side wiring 104 can be increased.

In addition, because the inductance of each charge path 21 is smaller than the inductance of each discharge path 22, the surge voltage caused when the direction of the current switches in the rectifying circuit 12 can be reduced more reliably by the charge path 21. In addition, the wiring inductance of the discharge path 22 can prevent the excessive rush current from occurring when a current flows due to the discharge.

In addition, with the power conversion apparatus 1 which includes the snubber circuit 2 as described above, even if the surge voltage caused by switching the direction of the current in the rectifying circuit 12 increases due to the resonance between the leakage inductance 110 of the transformer 11 and the parasitic capacitance 120a-120d included in the diodes 12a-12d of the rectifying circuit 12 and the reverse recovery current of the diodes 12a-12d, the surge voltage can be reduced to prevent the disruption the element.

In addition, because the smoothing inductor 16 is provided on at least one of the positive-side wiring 103 and the negative-side wiring 104, when the direction of the current switches in the rectifying circuit 12, the energy which charged the positive-side capacitor 211 and the negative-side capacitor 213 is extracted by the smoothing inductor 16 and is supplied to the load. Thus, because the energy accumulated on the inductance 110 when the direction of the current switches in the rectifying circuit 12 is supplied to the load via the smoothing inductor 16 except the conduction loss in the first diode 212 and the second diode 221, the electrical power can be supplied to the load without any significant losses.

2. Resonance Between Leakage Inductance 110 and Snubber Circuit 2

In the power conversion apparatus 1 according to the present embodiment, when a surge voltage is absorbed via the charge path 23, energy may be extracted from the negative-side capacitor 213 due to the voltage difference between the negative-side capacitor 213 and the negative-side capacitor $213_{i+1}$ and be supplied to the negative-side capacitor $213_{i+1}$ via the second diode $221_i$ and the inductor $231_i$. In addition, the output current from the rectifying circuit 12 does not flows from the positive-side capacitor $211_i$ to the side of the second diode $221_i$ but flows to the side of the negative-side capacitor $213_i$ (that is, via the charge path $21_i$) to charge the negative-side capacitor $213_i$. Thereby, the voltage at the negative-side capacitor $213_i$ may vibrate.

These vibration can be adjusted through the resonance period between the leakage inductance 110 of the transformer 11 and the inductance of the inductor 231 of the snubber circuit 2 and the capacitor of the charge path 21, and the resonance period between the leakage inductance 110 and the capacitor of the charge path 23. For example, the resonance period T2 between the inductance of the leakage inductance 110 and the inductor 231 and the positive-side capacitor $211_i$ and the negative-side capacitor $213_{i+1}$ in the charge path $23_i$ may be an even multiple (in the present embodiment, as one example, two times) of the resonance period T1 between the leakage inductance 110, and the positive-side capacitor $211_i$ and $211_{i+1}$ and the negative-side capacitor $213_i$ and $213_{i+1}$ in each of the charge path $21_i$ and $21_{i+1}$. Thereby, at the timing when the voltage of the positive-side capacitor $211_i$ and the negative-side capacitor $213_{i+1}$ with a large capacity increases due to the charging via the charge path 23 to reach the local maximum, the voltage of the capacitor with a small capacity in the charge path 21 is the local minimum. Therefore, the peak voltage caused between the positive-side wiring 103 and the negative-side wiring 104 is reliably reduced and the device destruction due to the surge voltage can be more reliably prevented. It is noted that the resonance period T2 may not be strictly an even multiple, but may be approximately an even multiple of the resonance period T1. The resonance period T2 may be in a range of 1.5 to 2.5 times of the resonance period T1.

Herein, the leakage inductance 110 of the transformer 11 may be equal to the inductance of the inductor 231 in the snubber circuit 2. In addition, the negative-side capacitor $213_{i+1}$ and the positive-side capacitor $211_i$ in the charge path $23_i$ may have a capacity equal to each other. In addition, the negative-side capacitor $213_i$ and the positive-side capacitor $211_{i+1}$ in the discharge path $22_i$ which passes the second diode $221_{i+1}$ and the inductor $231_i$ may have a capacity equal to each other. Thereby, the adjustment of the resonance period can be done more easily.

That is, in this case, each of the capacities of the negative-side capacitor $213_i$ and the positive-side capacitor $211_{i+1}$ with a smaller capacity can be indicated as Ca, and each of the capacities of the negative-side capacitor $213_{i+1}$ and the positive-side capacitor $211_i$ with a larger capacity can be indicated as Cb. Therefore, when the leakage inductance 110 of the transformer 11 is Lt and the inductance of the inductor 231 in the snubber circuit 2 is Ls (=Lt), the resonance period T1 and T2 can be represented as the formula (4) and (5), and the T2 can be easily set to an even multiple (as one example, two times) of T1 by adjusting Ca, Cb, and Lt. As one example, Cb may be five to six times of Ca.

$$T1 \approx 2\pi\sqrt{\{Lt \cdot 2Ca \cdot Cb/(Ca+Cb)\}}$$

$$T2 \approx 2\pi\sqrt{\{(Lt+Ls) \cdot Ca/2\}} \tag{4}$$

$$= 2\pi\sqrt{(Lt \cdot Ca)} \tag{5}$$

Figure 5:
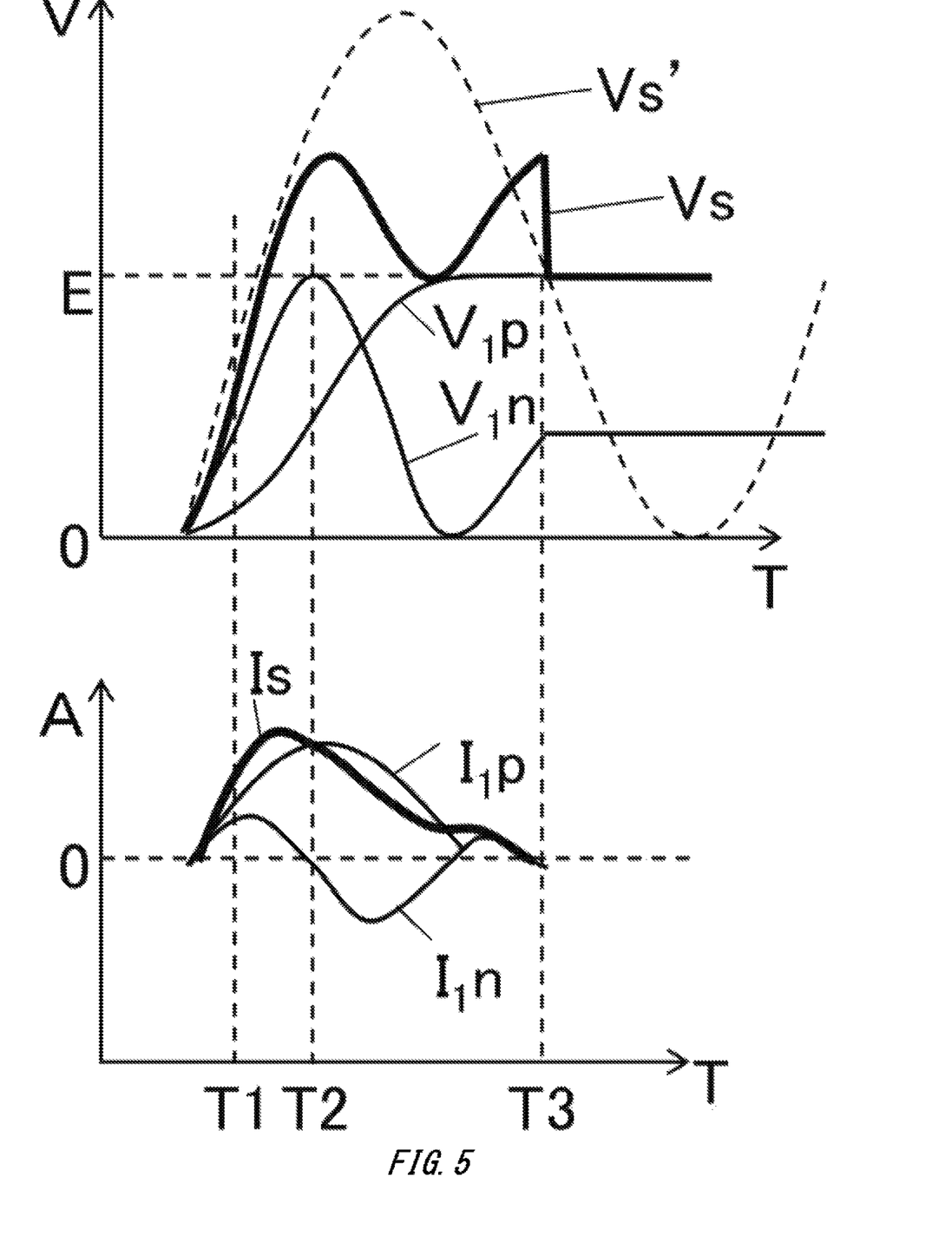
FIG. 5 shows an operation waveform of the snubber circuit 2.

FIG. 5 shows an operation waveform of the snubber circuit 2. In the figure, the upper graph shows the relationship between the time and the voltage $V_1p$ of the positive-side capacitor $211_1$, the voltage $V_1n$ of the negative-side capacitor $213_1$, the output voltage Vs of the snubber circuit 2, and the output voltage Vs' of the conventional snubber circuit. In addition, in the figure, the lower graph shows the relationship between the time and the current $V_1p$ of the positive-side capacitor $211_1$, the current $I_1n$ of the negative-side capacitor $213_1$, and the output current Is of the snubber circuit 2. It is noted that the conventional snubber circuit may be, for example, the circuit where a single snubber capacitor is connected between the positive-side wiring 103 and the negative-side wiring 104.

First, when the direction of the current in the rectifying circuit 12 switches, the positive-side capacitor $211_1$ and the negative-side capacitor $213_1$ of the charge path $21_1$ are charged, and the voltage of the negative-side capacitor $213_1$ with a smaller capacity increases earlier and suppresses the increase of the current Is (time point T1).

Next, the current output from the rectifying circuit 12 due to the self-induction effect of the leakage inductance 110 flows to the charge path 23 and charges the negative-side capacitor $213_2$, so that the increase of the voltage $V_1n$ of the negative-side capacitor $213_1$ is suppressed. In addition, a current is extracted from the negative-side capacitor $213_1$ by the inductor 231 of the charge path 23, so that the voltage $V_1n$ decreases (time point T2).

Then, the negative-side capacitor $213_1$ is recharged by the current further output from the rectifying circuit 12 due to the self-induction effect of the leakage inductance 110 (time point T3). Herein, because the voltage $V_1P$ of the positive-side capacitor $211_1$ alone is lower than the electromotive force E of the secondary side of the transformer 11, the discharge from the discharge path $22_1$ does not occur. Similarly, because the combined voltage $V_1n+V_2P$ obtained by combining the voltage $V_1n$ of the negative-side capacitor $213_1$ and the voltage $V_2P$ of the positive-side capacitor $211_2$ is lower than the electromotive force E, the discharge from the discharge path $22_2$ does not occur. Similarly, the voltage $V_2n$ of the negative-side capacitor $211_2$ alone is lower than the electromotive force E of the secondary side of the transformer 11, the discharge from the discharge path $22_3$ does not occur. Therefore, the energy which charged the positive-side capacitor 211 and the negative-side capacitor 213 is not charged and discharged through the resonance behavior between leakage inductance 110, and the positive-side capacitor 211 and the negative-side capacitor 213 to be consumed as a circuit loss.

3. Variation

Figure 6:
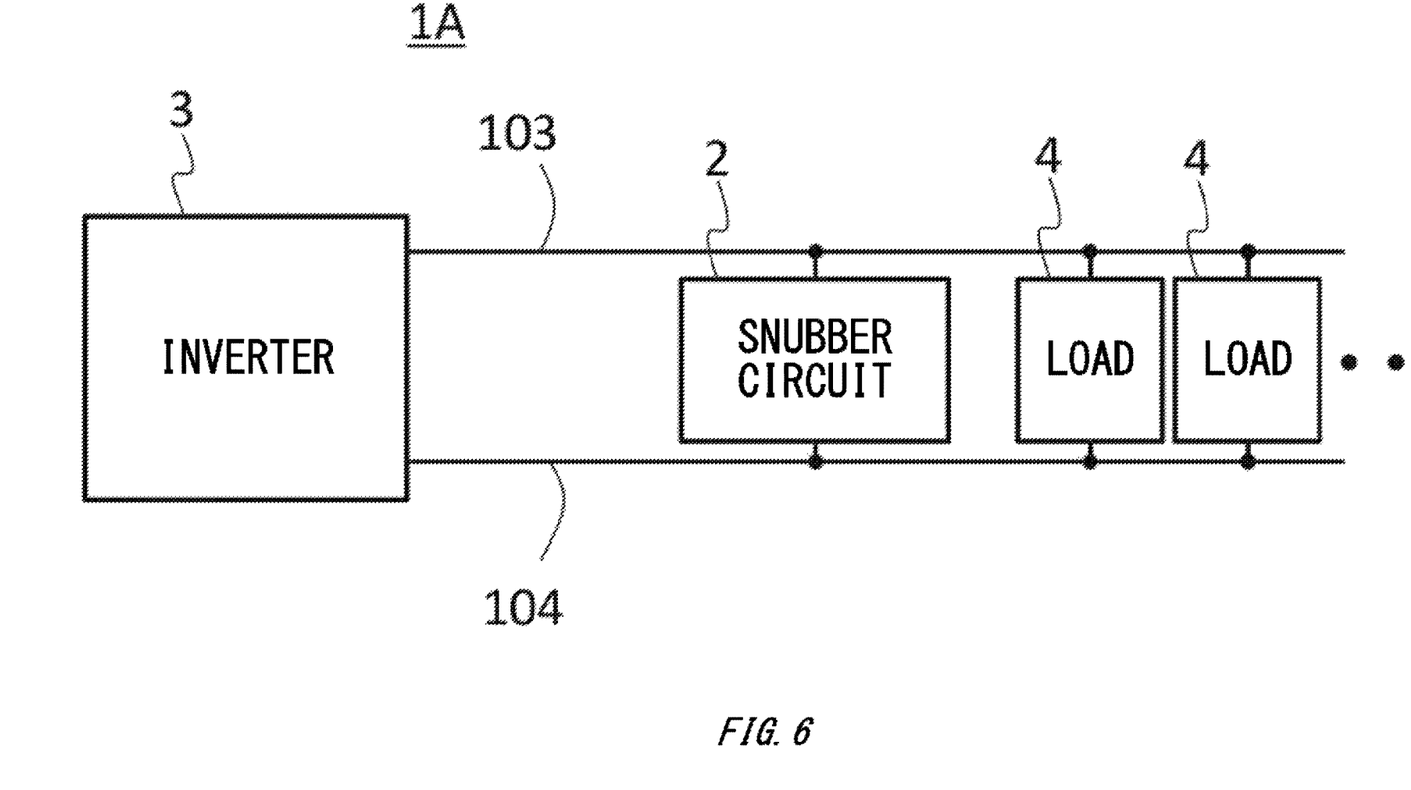
FIG. 6 shows a power conversion apparatus 1A according to a variation.

FIG. 6 shows the power conversion apparatus 1A according to a variation. The power conversion apparatus 1A may include the inverter 3 which outputs DC voltage between the positive-side wiring 103 and the negative-side wiring 104, and the snubber circuit 2. A plurality of the loads 4 may be connected in parallel with the power conversion apparatus 1A. It is noted that the inverter 3 may generate DC voltage from AC voltage. The inverter 3 may be a chopper.

According to the power conversion apparatus 1A as described above, because the snubber circuit 2 is connected between the positive-side wiring 103 and the negative-side wiring 104 through which the DC voltage is output, the surge voltage can be reduced when the current is interrupted in any of the plurality of loads 4 connected in parallel with the positive-side wiring 103 and the negative-side wiring 104. Therefore, the disruption of the other loads 4 due to the surge voltage can be prevented.

4. Other Variations

It is noted that the above-described embodiment and variations describes that the power conversion apparatus 1 and 1A include one snubber circuit 2 between the positive-side wiring 103 and the negative-side wiring 104, but it may also include a plurality of the snubber circuits 2 in parallel. In this case, the device destruction due to the surge voltage can be prevented more reliably. For example, if the power conversion apparatus 1 includes two snubber circuits 2, one snubber circuit 2 may be provided such that it is physically adjacent to the series circuit of the diode 12a and 12b in the rectifying circuit 12, and the other snubber circuit 2 may be provided such that it is physically adjacent to the series circuit of the diode 12c and 12d.

In addition, although the inductance of the wiring connected to the positive-side wiring 103 or the negative-side wiring 104 is described as the leakage inductance 110 of the transformer 11, it may also be a wiring inductance of the wiring or an inductor provided on the wiring.

In addition, although the quantity N of the charge paths 21 are described as two, it may be three or more. In this case, the quantity of the other charge paths 23 may be one, or may be two or more.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 1 power conversion apparatus, 2 snubber circuit, 3 inverter, 4 load, 10 AC power source, 11 transformer, 12 rectifying circuit, 12a-12d diode, 16 smoothing inductor, 17 smoothing capacitor, 21 charge path, 22 discharge path, 23 charge path, 101 positive-side output terminal, 102 negative-side output terminal, 103 positive-side wiring, 104 negative-side wiring, 110 leakage inductance, 120 parasitic capacitance, 211 positive-side capacitor, 213 negative-side capacitor, 221 second diode, 231 inductor

What is claimed is:
1. A snubber circuit, comprising:
N charge paths (N is an integer equal to or larger than two) in parallel, each of which includes a positive-side capacitor, a first diode, and a negative-side capacitor which are sequentially connected in series between a positive-side wiring and a negative-side wiring, and conducts current from a side of the positive-side wiring to a side of the negative-side wiring;

N+1 discharge paths in parallel, each of which includes a second diode connected between the negative-side wiring, or the negative-side capacitor in kth charge path among the N charge paths, and the positive-side wiring, or the positive-side capacitor in k+1th charge path (k is an integer equal to or larger than 0 and smaller than N) among the N charge paths, and conducts current from the side of the negative-side wiring to the side of the positive-side wiring via at least one of the negative-side capacitor and the positive-side capacitor; and other charge paths, each of which includes an inductor connected in series with the second diode between the positive-side capacitor in ith charge path (i is an integer equal to or larger than one and equal to or less than N−1) among the N charge paths and the negative-side capacitor in i+1th charge path, and conducts current from the side of the positive-side wiring to the side of the negative-side wiring via the positive-side capacitor in the ith charge path, the second diode, the inductor, and the negative-side capacitor in the i+1th charge path, wherein the positive-side capacitor and the negative-side capacitor included in the other charge paths among the positive-side capacitor and the negative-side capacitor in the ith charge path and the i+1th charge path have a larger capacity than each of the positive-side capacitor and the negative-side capacitor which are not included in the other charge paths.

2. The snubber circuit according to claim 1, wherein
the negative-side capacitor and the positive-side capacitor in the other charge paths have a capacity equal to each other,
the negative-side capacitor and the positive-side capacitor in the discharge path passing through the second diode and the inductor have a capacity equal to each other.

3. The snubber circuit according to claim 1, wherein N is two.

4. The snubber circuit according to claim 1, wherein an inductance of each charge path is smaller than an inductance of each discharge path.

5. A power conversion apparatus, comprising:
a transformer whose primary side is connected to an AC power source;
a rectifying circuit which is connected to a secondary side of the transformer and outputs DC voltage between a positive-side wiring and a negative-side wiring depending on an output from a secondary side of the transformer; and
a snubber circuit according to claim 1, which is connected between the positive-side wiring and the negative-side wiring.

6. A power conversion apparatus, comprising:
an inverter or a chopper which outputs DC voltage between a positive-side wiring and a negative-side wiring; and
a snubber circuit according to claim 1, which is connected between the positive-side wiring and the negative-side wiring.

7. The power conversion apparatus according to claim 5, wherein
a wiring of at least one of the positive-side wiring and the negative-side wiring has an inductance;
a resonance period between an inductance of the wiring and an inductance of the inductor in the snubber circuit, and the positive-side capacitor and the negative-side capacitor in the other charge paths is an even multiple of a resonance period between the inductance of the wiring, and the positive-side capacitor and the negative-side capacitor in each of the ith charge path and the i+1th charge path.

8. The power conversion apparatus according to claim 7, wherein
a resonance period between the inductance of the wiring and an inductance of the inductor in the snubber circuit, and the positive-side capacitor and the negative-side capacitor in the other charge paths is two times of a resonance period between the inductance of the wiring, and the positive-side capacitor and the negative-side capacitor in each of the ith charge path and the i+1th charge path.

9. The power conversion apparatus according to claim 7, wherein the inductance of the wiring is equal to an inductance of the inductor in the snubber circuit.

10. The power conversion apparatus according to claim 6, further comprising a smoothing inductor provided on at least one of the positive-side wiring and the negative-side wiring.

11. The power conversion apparatus according to claim 6, comprising a plurality of the snubber circuits between the positive-side wiring and the negative-side wiring.

* * * * *